US005345293A

United States Patent [19]

Baek et al.

[11] Patent Number: 5,345,293
[45] Date of Patent: Sep. 6, 1994

[54] FEEDER OF CONTINUOUS DOCUMENTS FOR A COPY MACHINE

[75] Inventors: In K. Baek, Yongsan Gu; Jae J. Kim, Songpa Gu; Jin Y. An, Dobong Gu, all of Rep. of Korea

[73] Assignee: Sindo Ricoh Co., Ltd., Seoul, Rep. of Korea

[21] Appl. No.: 132,442

[22] Filed: Oct. 6, 1993

Related U.S. Application Data

[63] Continuation of Ser. No. 757,689, Sep. 11, 1991, abandoned.

[30] Foreign Application Priority Data

Sep. 28, 1990 [KR] Rep. of Korea ................ 1990-15566

[51] Int. Cl.[5] ...................... G03B 27/62; G03G 21/00; B41F 1/28

[52] U.S. Cl. ...................................... 355/75; 355/308; 226/86; 101/407.1; 400/616.3

[58] Field of Search ...................... 226/76, 79, 86, 200; 400/616, 616.1, 616.2, 616.3; 101/407.1; 355/50, 51, 75, 202, 308, 311

[56] References Cited

U.S. PATENT DOCUMENTS

| | | | |
|---|---|---|---|
| Re. 31,888 | 5/1985 | Ward et al. | 355/75 X |
| 2,095,292 | 10/1937 | Sherman | 400/616.3 X |
| 2,456,734 | 12/1948 | Ritzert | 400/616.2 X |
| 2,493,411 | 1/1950 | Lanegan et al. | 400/616.3 X |
| 3,448,906 | 6/1969 | Walsh et al. | 226/79 X |
| 4,026,405 | 5/1977 | de Poncins | 400/616.3 X |
| 4,087,172 | 5/1978 | Van Dongen | 226/79 X |
| 4,264,200 | 4/1981 | Tickner et al. | 355/309 X |
| 4,579,449 | 4/1986 | Leroy | 355/75 |
| 4,619,389 | 10/1986 | Isobe | 226/79 |
| 4,822,190 | 4/1989 | Yokoi | 226/79 X |
| 4,844,434 | 7/1989 | Acquaviva et al. | 355/308 X |
| 4,933,722 | 6/1990 | Fujiwara | 355/235 X |
| 4,963,941 | 10/1990 | Negishi et al. | 355/308 X |
| 5,079,588 | 1/1992 | Ohira et al. | 355/235 X |
| 5,105,225 | 4/1992 | Honjo et al. | 355/235 X |
| 5,128,713 | 7/1992 | Watanabe | 355/75 |

*Primary Examiner*—Daniel P. Stodola
*Assistant Examiner*—Michael R. Mansen
*Attorney, Agent, or Firm*—Darby & Darby

[57] ABSTRACT

A feeder of continuous documents for a copy machine comprising an upper frame having a pair of support walls, a cover formed at one end of said upper frame and provided at its upper end with an extension, and a lower frame adapted to define a path for travelling the documents and provided at both sides thereof with a pair of extensions extending beyond the other end of the upper frame. A tractor is fixedly mounted to a drive shaft mounted to the lower frame to be driven by the drive force of a motor and formed of a circular shape to increase the concentration of forces of drawing the documents. The motor drives according to the control of a motor driving unit. In order to supply a control signal to the motor driving unit, at least two sensors are provided. The feeder provides drawing the documents more powerfully and thus feeding them precisely. By virtue of the provision of several sensors, the feeder can be used for the case of narrow documents.

3 Claims, 5 Drawing Sheets

FEEDER OF CONTINUOUS DOCUMENTS FOR A COPY MACHINE

This is a continuation of application Ser. No. 07/757,689, filed Sep. 11, 1991, now abandoned.

BACKGROUND OF THE INVENTION

1. Field of The Invention

The present invention relates to a feeder of continuous documents for a copy machine which feeds continuous documents one by one to a platen of the copy machine by sensing light from a scanner of copy machine.

2. Description of The Prior Art

Referring to FIG. 1, there is shown an example of conventional feeders of continuous documents for copy machines. In the feeder, continuous documents which are continuous papers printed by a printer of a computer are placed on a upper frame 201 of the feeder. The first document of the placed continuous documents is inserted between an extension 203 of a cover 202 and an extension 204 of the upper frame 201 and then conveyed along a travelling path defined between a lower frame 205 and a platen of copy machine so that it is engaged with a tractor 206. Thereafter, when the copy machine is turn on, the continuous documents are travelled on the platen of copy machine at the same speed as copying speed.

However, the known feeder has disadvantages that during feeding, the documents placed on the upper frame 1 may be disheveled, that it is difficult to convey documents due to friction and static electricity generated between the travelling documents and parts of the feeders being in contact with the travelling documents on the travelling path, and that the elliptical tractor does not have sufficient force to draw the documents, so that feeding of the documents may be interrupted.

SUMMARY OF THE INVENTION

Accordingly, an object of the present invention is to overcome the above-mentioned disadvantages encountered in the prior arts and to provide a feeder of continuous documents for copy machine which prevents disheveling of continuous documents placed on a upper frame thereof.

Another object of the invention is to provide a feeder of continuous documents for copy machine which diminishes or eliminates friction and static electricity between the travelling documents and parts of the feeder being in contact with the travelling documents.

A further object of the invention is to provide a feeder of continuous documents for a copy machine which draws the documents more powerfully so as to feed them precisely.

In order to achieve the above objects, the feeder of continuous documents for a copy machine according to the present invention comprises an upper frame adapted to stably place continuous documents thereon and provided at both ends thereof with a pair of support walls; a cover formed at one end of said upper frame and provided at its upper end with an extension which has with a plurality of longitudinally extending protrusions at the area being in contact with the travelling documents; a lower frame adapted to define a path for travelling the documents and provided at both sides thereof with a pair of extensions extending beyond the other end of the upper frame and functioning to rotatably mount a drive shaft connected to a motor, respectively; a tractor fixedly mounted to said drive shaft to be driven by the drive force of the motor and formed of a circular shape to increase the concentration of forces of drawing the documents; motor driving means adapted to control the rotation rate and the rotation range of the motor; and sensing means adapted to supply a control signal to said motor driving means and having a plurality of sensors.

BRIEF DESCRIPTION OF THE DRAWINGS

The present invention will become apparent from the following description of embodiment with reference to the accompanying drawings in which.

DETAILED DESCRIPTION OF THE PREFERRED EMBODIMENTS

Figure 1:
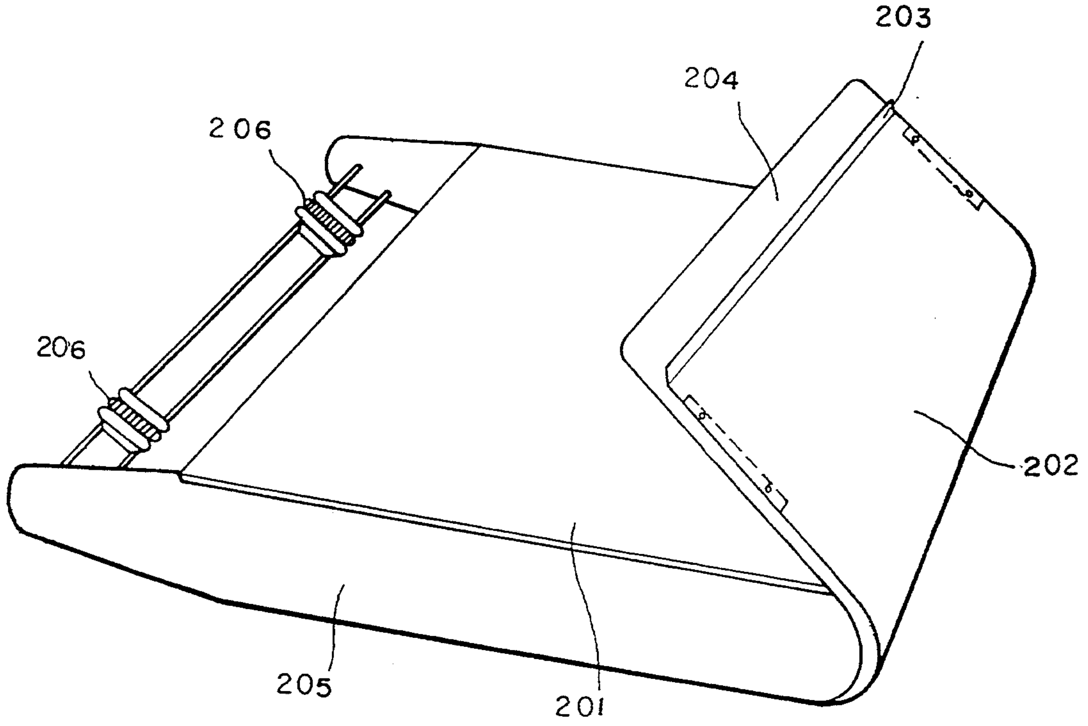
Fig. 1 PRIOR ART
FIG. 1 is a perspective view showing a conventional feeder.
Figure 2:
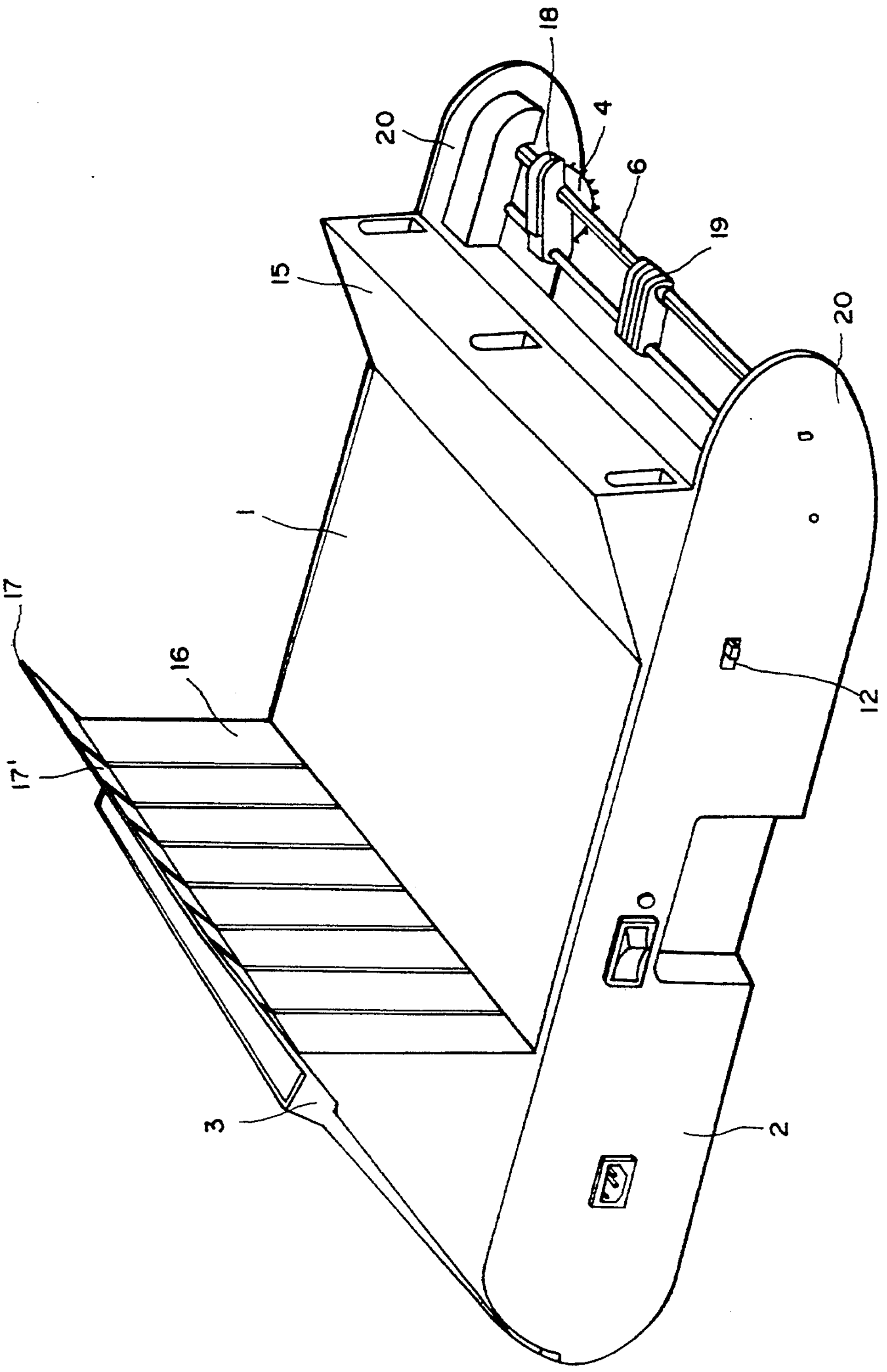
FIG. 2 is a perspective view showing a feeder according to a preferred embodiment of the present invention.

Referring to FIG. 2, there is shown a feeder of continuous documents for copy machine in accordance with the present invention. The feeder comprises an upper frame 1, a lower frame 2, and a cover 3 formed at one end of the upper frame 1. The upper frame 1 is adapted to load documents thereon and provided at both ends thereof with an inclined support wall 15 and a vertical support wall 16, respectively, so that the documents are stably disposed on the upper frame 1.

The cover 3, which serves to guide smoothly the documents into their travelling path, is formed at its upper end with an extension 17. In order to minimize the area being in contact with the travelling documents, the cover is also provided at the inner surface thereof with a plurality of protrusions 17' longitudinally extending along the extension 17 which is in contact with the travelling documents. Protrusions similar to the protrusions 17' are also formed on the vertical support wall 16.

The lower frame 2 defines a path along which the documents travels and has at both sides a pair of spaced extensions 20 extending longitudinally beyond the support wall 15. A drive shaft 6 is rotatably mounted at its both ends to the extensions 20 of lower frame 2.

A tractor 4 is fixedly mounted to the drive shaft 6. The tractor 4 is of a circular shape which is distinguished from the elliptical shape of the conventional push-type tractor. This circular shape of the tractor 4 increases the concentration of forces drawing the documents, thereby enabling the documents to be fed precisely. On the drive shaft 6, a document guider 19 is also mounted which prevents the travelling documents from being rumpled and enables the travelling of documents to be smooth.

Figure 3:
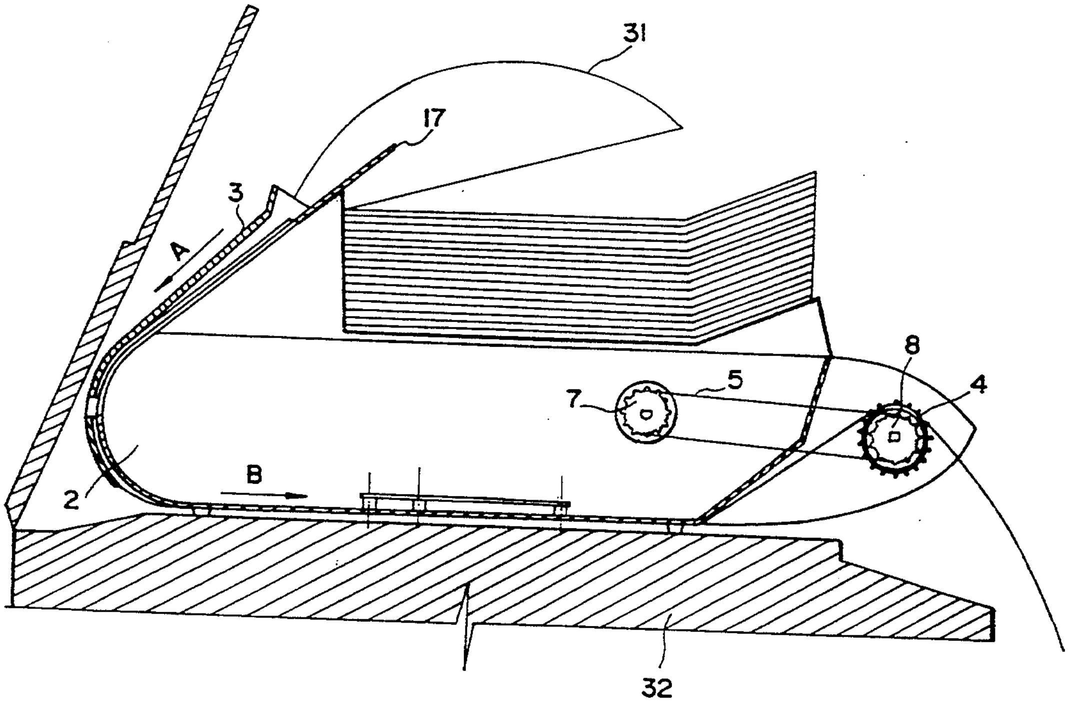
FIG. 3 is a sectional view explaining the operation of the feeder according to the present invention which is disposed on a platen of a copy machine.
Figure 4:
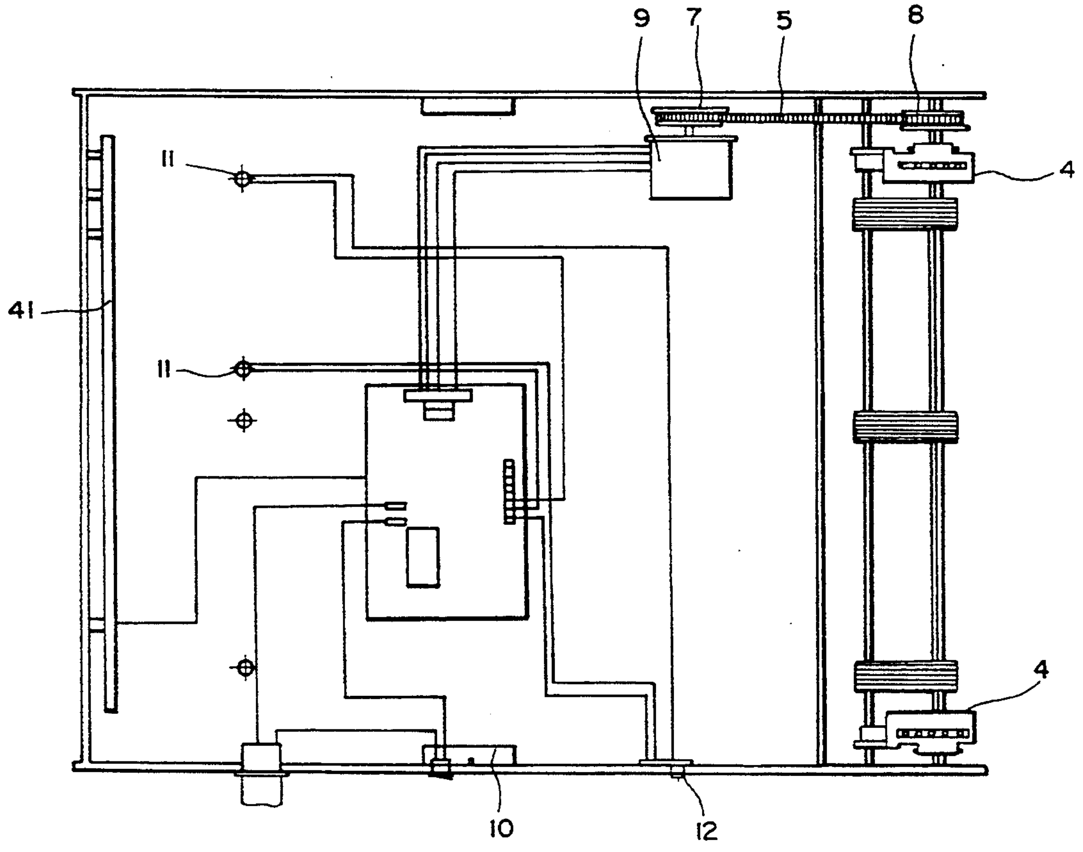
FIG. 4 is a plan view showing the feeder according to the present invention.

As shown in FIGS. 3 and 4, the reference numeral 5 designates a belt, 7 a drive pulley, 8 a driven pulley operatively connected with the drive pulley 7 via the belt 5, 12 a selector switch, 18 a retainer for documents, and 32 a platen of the copy machine. The drive pulley 7 is connected to the shaft of a motor 9 which drives according to the control of a motor driving unit 10, as will be described hereinafter.

Operation of the above-mentioned feeder according to the present invention will now be described in conjunction with FIGS. 3 and 4.

The first document of the documents placed on the upper frame 1 is manually fed between the lower frame 2 and the platen 32 via the travelling path between the cover 3 and the extension 17 and then engaged with the tractor 4. Thereafter, power is supplied to the copy machine to initiate the operation thereof. A scanner of the copy machine is then moved to the left end (or the right end) of the document. Reaching of the scanner to the left end of document is sensed by a sensor 11 which generates a sensing signal and applies it to the motor driving unit 10 for driving the motor 9 so that the document is fed a predetermined distance. That is, the motor 9 rotates the times corresponding to the counted value in the driving unit 10 in a well-known manner, thereby causing the drive pulley 7 connected to the shaft of motor 9. The driving force of drive pulley 7 is transmitted to the driven pulley 8 via the belt 5 so that the tractor 4 is rotated to feed the document a distance corresponding to the length of one page.

In order to accomplish sensing the reaching of scanner to the left end of document in the case of narrow documents, at least two sensors 11 are provided as shown in FIG. 4. Although the sensors are arranged near the left end of the feeder in the embodiment illustrated in FIG. 4, the arrangement of sensors may be varied, depending upon the scanning direction. In order to select a sensor to be actuated, a selector switch 12 may be used.

A brush 41 which extends throughout the width of feeder is disposed at the place where a maximum frictional force occurs, so as to restrict mostly the generation of frictional force.

As above-mentioned, the motor driving unit 10 functions to drive the motor 9, in response to the sensing operation of the sensor, such that it feeds the documents a distance corresponding to one page.

Figure 5:
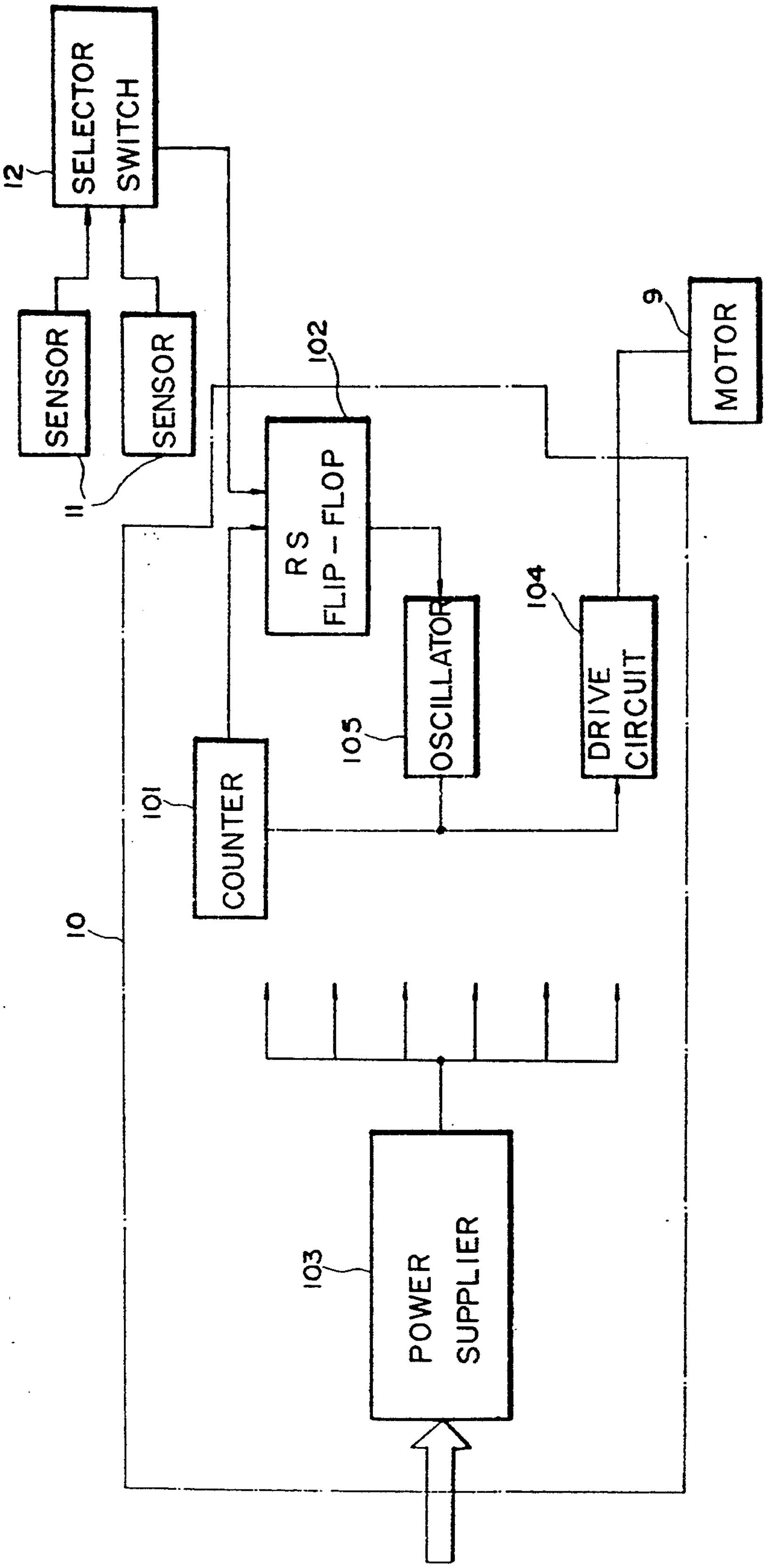
FIG. 5 is a block diagram showing a motor controller which is incorporated in the feeder according to the present invention.

Referring to FIG. 5, there is shown a block diagram of the motor driving unit 10. As shown in the drawing, the unit 10 comprises a counter 101, a R/S flip-flop 102, a power supplier 103, a drive circuit 104, and an oscillator 105. The counter 101, the R/S flip-flop 102 and the oscillator 105 constitute a pulse generating circuit which outputs a pulse signal when the sensor selected by the select switch 12 generates a sensing signal. The pulse signal is applied to the drive circuit 104 to drive the motor 9.

As apparent from the above description, the present invention provides a feeder for copy machine which can avoid the documents from being disheveled and reduce the friction and the static electricity generated between the travelling documents and parts of the feeder being in contact with the travelling documents. The feeder of the present invention also provides advantages of drawing the documents more powerfully and thus feeding them precisely. By virtue of the provision of several sensor, the feeder can be used for the case of narrow documents.

The invention has been described in detail with reference to a preferred embodiment thereof, but it will be understood that variations and modifications can be effected within the spirit and scope of the invention.

What is claimed is:

1. A feeder of continuous documents for use on a platen of a copy machine comprising:

an upper frame having a top side, a bottom side and two ends, one of said ends having a vertical support wall, the other of said ends having an inclined support wall, said upper frame providing a stable platform for placement of said continuous documents;

a cover formed at said one end of said upper frame, said cover having an upper end, said upper end having an extension which has a plurality of longitudinally extending protrusions at the area being in contact with the travelling documents;

a motor having a drive shaft;

a lower frame defining a path for travelling the documents, said lower frame is mounted to said bottom side of said upper frame, said lower frame having two sides, each of said sides having an extension extending beyond said other end of the upper frame and functioning to rotatably mount said drive shaft;

a tractor fixedly mounted to said drive shaft to be driven by the drive force of the motor, said tractor being circular in shape in order to increase the concentration of forces drawing the documents;

motor driving means for controlling a rotation rate and a rotation range of the motor; and sensing means located between said two sides of said lower frame for sensing a scanner operation of said copy machine and for supplying a sensed signal to said motor driving means, wherein said sensed signal is used in informing a driving time of the motor to said driving means.

2. A feeder of continuous documents for a copy machine in accordance with claim 1, wherein a document guider is fixedly mounted to said drive shaft.

3. A feeder of continuous documents of a copy machine in accordance with claim 1, wherein a brush extending throughout the width of said feeder is disposed at said lower frame.

* * * * *